Oct. 24, 1961 H. L. BABCOCK 3,005,912
METHOD OF PRODUCING VISUAL STANDARDS AND ARTICLE PRODUCED
Filed April 4, 1955 2 Sheets-Sheet 1

INVENTOR.
Harry L. Babcock.
BY

Oct. 24, 1961  H. L. BABCOCK  3,005,912
METHOD OF PRODUCING VISUAL STANDARDS AND ARTICLE PRODUCED
Filed April 4, 1955  2 Sheets-Sheet 2

INVENTOR.
Harry L. Babcock.
BY

United States Patent Office 3,005,912
Patented Oct. 24, 1961

3,005,912
METHOD OF PRODUCING VISUAL STANDARDS AND ARTICLE PRODUCED
Harry L. Babcock, Hammond, Ind., assignor, by mesne assignments, to Union Tank Car Company, Chicago, Ill., a corporation of New Jersey
Filed Apr. 4, 1955, Ser. No. 499,038
2 Claims. (Cl. 250—65)

The invention relates to welding analysis and particularly to a novel method which provides a visual representation of standards of allowability set by various controlling organizations.

As is well known to those skilled in the art, various welding techniques are utilized in the fabrication and construction of many types of equipment and many types of structure. It is extremely important in most welding applications, because of the use to which the fabricated product is to be put, that the welding and joining technique employed be sound, such that it will resist the strains and stresses to which the product is subjected in actual use. There are several methods presently employed in the art of determining whether a welding joint or seam is satisfactory, among them being the so-called radiographic method, wherein the particular seam under consideration is photographed by means of X-ray equipment and the like and the photograph produced studied to determine if the bond provided meets minimum standards.

In connection with standard determination, it is well known that various commercial organizations having an interest in the welded products have, by common effort and study, established standards of welding allowability keyed to the information assembled by radiographic study of welded joints. Among such organizations are The American Petroleum Institute herein designated "API" and The American Society of Mechanical Engineers herein designated "ASME." These organizations promulgate standards to which various industries adhere, knowing that if a given welded joint meets the standard, it will be satisfactory from the standpoint of quality product produced. It will be noted that these standards may vary with the different organizations promulgating them and are usually dictated by the use to which the contemplated products are put. However, though the standards vary, they do approach the problem in a common manner and the herein disclosed invention may be utilized with any of the standards used by industry today.

As will be hereinafter more fully explained, the standards generally vary depending on the thickness of the members which are joined by welding. It will also be understood that it is virtually impossible to provide a welded joint without some type of imperfection therein. The standards, therefore, are arranged to define the maximum allowable imperfection in a given length of welded joint and still satisfy the quality requirements of satisfactory product use. In the description of the invention we will utilize, by way of illustration, certain standards that have been promulgated by the API and illustrate the application of the herein disclosed invention to said standards.

It has long been a problem in the art to provide a simple, easy and effective means for comparing a given weld photograph with a particular applicable standard. In the past the standards have been set down as verbal descriptions and the skill of the examining technician was employed to translate or compare the verbal standard to the weld photograph obtained from the particular welded joint under consideration. This required a skilled and conscientious man to make this comparison and determination and in practice has resulted in frequent errors being made both from the standpoint of allowing an unsatisfactory welded joint and rejecting a satisfactory welded joint. It has long been felt that the art needed accurate visual representations or exemplifications of allowable welding defects which accurately reflected the given standard to be employed. To date such a visual standard has not been available because the welding operation prevented any accurate control of the imperfections which would be produced and made impossible the production of a weld having imperfections therein that corresponded accurately to the allowable standard.

Accordingly, it is a primary object of the invention to provide a novel method whereby accurate visual representation of an allowable welding standard may be easily and readily produced.

It is a specific object of the invention to provide a method of the type described that is readily adaptable and can readily produce visual representations of any of the standards currently employed in industry.

It is a further specific object of the invention to provide an article comprising a visual representation of an allowable welding standard.

These and other objects of the invention will become apparent in the course of the following description and from an examination of the concerned drawings, wherein.

It will be understood that the term "photograph" as herein used may be defined as any image, whether positive or negative, similar to the standard X-ray photograph, which accurately indicates internal formation and which may be obtained by radiographical procedures or the like.

Figure 1:
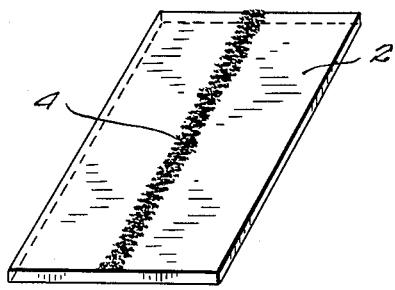
FIGURE 1 is a perspective view of a metal plate having a weld deposit therein.

Describing the invention in detail, it will be seen that FIGURE 1 illustrates a plate 2 having a longitudinally arranged deposit of weld material 4 therein. To practice the invention, the deposit 4 must be substantially pure and without imperfections, this result being obtainable by mere experimentation for a short run of weld deposit required to practice the invention.

Figure 2:
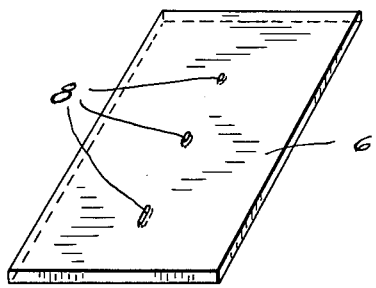
FIGURE 2 is a perspective view of a welded plate having defects therein.

A plate 6 is illustrated in FIGURE 2, said plate being provided with a plurality of holes or defects 8 formed therein in a predetermined arrangement relative to each other. The defects 8 may be put in the plate in any conventional manner, such as, for example, by cutting, etching or forming.

It is well known to those skilled in the art that imperfections in welded joints may be due to any of the following, that is, incomplete fusion or penetration, cracks and undercutting, an exces of porosity in the weld, or inclusions due to the entrapment of slag or other foreign matter in the weld material during the welding process.

It will be understood that any type of crack or incomplete fusion or penetration renders the weld rejectable under virtually all commercial standards, hence there is no need for a standard comparison with regard to this defect. A weld inspector, when he finds such a defect, merely rejects the weld and requires repair.

With regard to inclusions and porosity, however, the situation is somewhat different. It is here that the particular welding standard must be accurately applied to determine if the defects in the particular weld under consideration fall within the allowable standard applied. For illustrative purposes, a typical API welding standard may be noted as follows:

"Sections of welds that are shown by radiography to have any of the following types of imperfections shall be judged unacceptable and shall be repaired as provided in I.14 and I.15.

"(1) Any type of crack or zone of incomplete fusion or penetration.

"(2) Any elongated inclusion having a length greater than ⅔ T, or ¾ in., maximum, where T is the thickness of the thinner plate welded, except that any such imperfection shorter than ¼ in. shall be acceptable for any plate thickness.

"(3) Any group of inclusions in line where the sum of the longest dimensions of all such imperfections is greater than T in a length of 6T (or proportionately for radiographs shorter than 6T) except when the distance between successive imperfections exceeds 3L where L is the length of the longest imperfection in the group.

"(4) Porosity in excess of that shown as acceptable in the standards."

It will be seen from an examination of the above standard that the defects in the welds primarily relate to the particular plate thickness making up the welded joint. It will then be understood that the dimensional standard will vary, depending on the particular thickness of the plate employed.

In providing plate 6 with defects, it will first be determined which standard is under consideration and the in line defects will be formed to correspond to the requirement for that thickness of plate.

Figure 3:
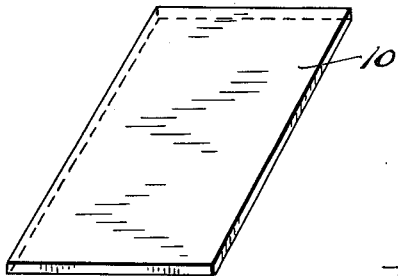
FIGURE 3 is a perspective view of a plain plate.
Figure 4:
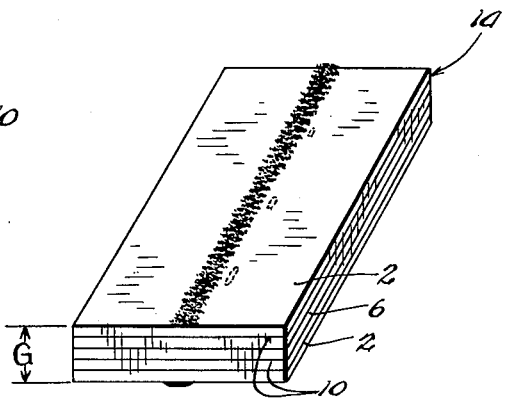
FIGURE 4 is a perspective view illustrating the plates of FIGURES 1, 2 and 3 in assembled relationship.

After the particular defects 8 are formed in the plate 6, the plate 2 and the plate 6 are arranged in face to face abutting relationship as indicated in FIGURE 4. It is preferable to utilize a pair of plates 2, one on the top and one on the bottom of the arrangement, with the defect containing plate 6 interposed therebetween. If the combined thickness of the plates 2 and 6 do not meet the thickness desired for the particular standards as indicated at G in FIGURE 4, additional plain plates 10, as shown in FIGURE 3, may be interposed between the remote plates 2 of the arrangement. FIGURE 4 shows such an arrangement with the plates 2 on the top and bottom, the plate 6 centrally located and plates 10 interposed between the plate 6 and the respective remote plates 2.

The upper and lower weld deposits 4 and the line defects 8 are then placed in substantial planar alignment or relationship. The entire assembled unit 14 may then be photographed, using standard techniques, and the result is a visual representation of an apparently homogeneous weld having defects therein that accurately correspond to the particular predetermined standard.

Figure 5:
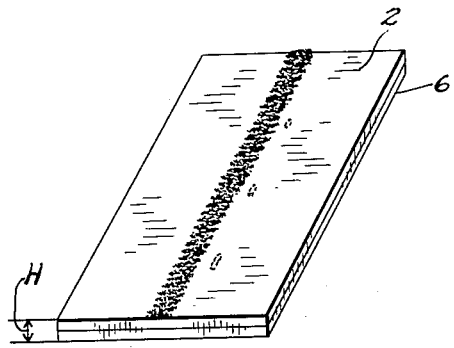
FIGURE 5 is a modification of the arrangement illustrated in FIGURE 4, and FIGURES 6 and 7 are illustrations of the article produced by the novel method.

Directing attention to the embodiment of FIGURE 5, it will be seen that where the standard is applied to thinner plates, only two plates may be utilized to obtain the result desired. That is, a single weld deposit plate 2 and a single plate 6 containing defects may be arranged in face to face abuting relationship in a manner similar to that above described and the entire arrangement may be photographed to obtain the representation desired.

Figure 6:
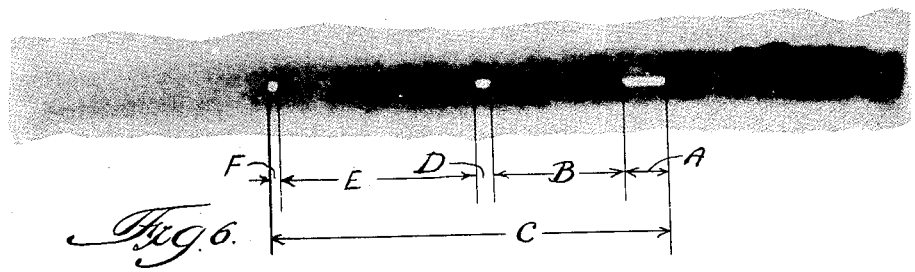
Figure 7:
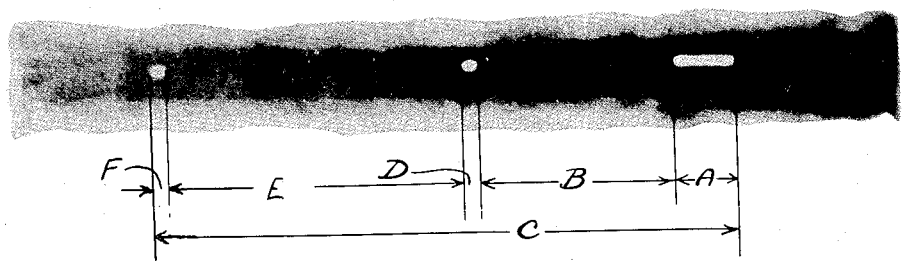

Directing attention to FIGURES 6 and 7, it will be seen that they illustrate the API standards set out above as applied to welded joints on ½ inch (FIGURE 6) and ¾ inch (FIGURE 7) plate. The maximum single inclusion is illustrated by the dimension A, while the distance between successive imperfections or inclusions is illustrated by the dimensions B and E. Further, the critical length of the sum total of imperfections is graphically shown by the dimension C and the maximum total length of imperfections in a distance C is illustrated by the sum of the distances A and D and F.

A penetrometer (not shown) may be used to indicate proper exposure in the usual manner as is well understood by those skilled in the art.

Thus it will be seen that by the use of the novel method herein set out it is possible to produce weld photographs which show any desired defects therein, said defects being arranged in a determined relationship to each other and an article has been made that accurately visually represents a verbal standard.

It will be appreciated that the disclosures herein are by way of illustration and not limitation and that the invention may be employed to produce any standard desired. It will also be understood that the same method may be utilized in producing visual representations of porosity standards as well as the in line inclusion standards illustrated.

It will further be understood that the invention may be subject to reasonable variation without departing from the spirit thereof or from the scope of the appended claims.

I claim:

1. A method of producing a desired visual representation of a welding standard comprising the forming of defects in a metallic plate in such physical relation to each other so as to correspond to a predetermined standard, placing a substantially pure weld deposit in another metallic plate, placing said plates in juxtaposition with each other, aligning the defects and the weld deposit, and photographing the plates to produce a radiograph image of an apparent weld deposit with predetermined desired defects therein.

2. A method of producing a visual radiograph representation of welding standards comprising the placing of substantially pure weld deposits on a pair of plates, the forming of defects in another plate in a predetermined physical relationship to one another, interposing the other plate between said pair of plates, aligning the deposits and defects, and photographing all of the plates to produce an apparent image of a weld with defects therein in a determined and ordered relationship to each other.

References Cited in the file of this patent

UNITED STATES PATENTS

| | | |
|---|---|---|
| 1,275,669 | Forbes | Aug. 13, 1918 |
| 2,251,265 | Black | Aug. 5, 1941 |
| 2,524,839 | Schulman et al. | Oct. 10, 1950 |

OTHER REFERENCES

Welding Handbook, American Welding Society, New York, 1942, p. 1174.

Davies: The Science and Practice of Welding, Cambrige Univ. Press, 1947, pp. 333–336.

Clauser: "Practical Radiography For Industry," Reinhold Pub. Corp., New York, 1952, pp. 185 to 187.